United States Patent
Kin

(10) Patent No.: US 7,191,046 B2
(45) Date of Patent: Mar. 13, 2007

(54) MOTION CONTROL APPARATUS FOR VEHICLE

(75) Inventor: Keiyu Kin, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 403 days.

(21) Appl. No.: 10/798,835

(22) Filed: Mar. 11, 2004

(65) Prior Publication Data
US 2004/0236490 A1 Nov. 25, 2004

(30) Foreign Application Priority Data
Mar. 13, 2003 (JP) ............... 2003-067598

(51) Int. Cl.
*G06F 19/00* (2006.01)

(52) U.S. Cl. .......................... 701/70; 701/72

(58) Field of Classification Search .............. 701/70, 701/72, 78, 79, 80, 84, 200, 208; 303/121, 303/146; 180/197
See application file for complete search history.

(56) References Cited

U.S. PATENT DOCUMENTS

| | | | | |
|---|---|---|---|---|
| 4,848,851 A | * | 7/1989 | Kuraoka et al. | ............ 303/124 |
| 5,546,311 A | * | 8/1996 | Sekine | .................. 701/208 |
| 5,745,070 A | * | 4/1998 | Yamada | .................. 342/70 |
| 6,067,497 A | * | 5/2000 | Sekine et al. | ............. 701/93 |
| 6,675,090 B2 | * | 1/2004 | Matsuura | ............. 701/200 |
| 6,868,324 B2 | * | 3/2005 | Matsumoto et al. | ........ 701/72 |
| 2005/0187694 A1 | * | 8/2005 | Shiba et al. | ................. 701/70 |

FOREIGN PATENT DOCUMENTS

JP  3062777  5/2000

* cited by examiner

*Primary Examiner*—Gary Chin
(74) *Attorney, Agent, or Firm*—Carrier, Blackman & Associates, P.C.; Joseph P. Carrier; William D. Blackman

(57) ABSTRACT

A radius of a corner is determined by using a corner radius calculating device based on road data and data related to position of a vehicle on the road. An actual turning radius when the vehicle enters the corner is estimated by an actual turning radius calculating device based on at least a vehicle speed and motion parameters of the vehicle, and the motion state of the vehicle is controlled by the motion state control device so that an actual turning radius of the vehicle becomes close to the radius of the corner based on a calculation by radius difference calculating device for calculating a difference between the calculated corner radius and the actual turning radius. Thus, a motion state of the vehicle at a time of traveling around the corner is properly controlled to enable the vehicle to pass the corner reliably.

4 Claims, 7 Drawing Sheets

MOTION CONTROL APPARATUS FOR VEHICLE

BACKGROUND OF THE INVENTION

1. Field of the Invention

The present invention relates to a motion state control apparatus for controlling a motion state of a vehicle so as to pass a corner of a road properly by utilizing a so-called navigation system including road data storing means for storing road data, and an own vehicle position detecting means for detecting an own vehicle position on the road data.

2. Description of the Related Art

A motion control apparatus for a vehicle for controlling a vehicle speed so that the own vehicle properly passes a corner existing ahead of the own vehicle by utilizing a navigation system is already known (see Japanese Patent No. 3062777).

However, in the control for the vehicle to pass a corner easily by deceleration of the vehicle speed as in the above-described prior art, it is difficult to cope with such a situation as the driver excessively turns steering (hereinafter referred to as an operation which gives excessive steering input force exceeding the maximum lateral acceleration possible to occur with respect to the friction coefficient of the road surface on which the vehicle is traveling), and as the driver cannot decelerate to the speed at which the vehicle easily passes the corner. Consequently, it is desirable to make it possible to pass the corner more reliable by controlling the motion state of the vehicle properly even when excessive turning of steering occurs or even when it is not possible to decelerate sufficiently, and to enable the control to pass the corner reliably by properly determining the motion state of the vehicle at the corner.

SUMMARY OF THE INVENTION

The present invention is made in view of these circumstances, and has a first object to pass a corner reliably by properly controlling the motion state of the vehicle during traveling at the corner, and has a second object to determine the motion state of the vehicle during traveling at the corner properly and use it for the control to make the vehicle pass the corner.

In order to attain the above-described first object, according to a first feature of the present invention, there is provided a motion control apparatus for a vehicle, comprising: road data storing means for storing road data; own vehicle position detecting means for detecting an own vehicle position on the road data; vehicle speed detecting means for detecting an own vehicle speed; corner radius arithmetically operating means for obtaining a radius of a corner existing on a route on which an own vehicle is traveling at present, based on the road data and the own vehicle position; motion parameter detecting means for detecting motion parameters expressing a turning motion state of the own vehicle; actual turning radius arithmetically operating means for arithmetically operating and estimating an actual turning radius when the own vehicle enters the corner, based on at least the own vehicle speed and the motion parameters; radius difference calculating means for calculating a difference between the radius arithmetically operated at the corner radius arithmetically operating means and the actual turning radius; and motion state control means for controlling a motion state of the own vehicle based on a calculation by the radius difference calculating means so that the actual turning radius becomes close to the radius of the corner.

According to the construction of the first feature, the motion state of the vehicle is controlled based on the difference between the radius of the corner on which the own vehicle is traveling and the actual turning radius being the turning radius of the traveling locus which the own vehicle will draw when entering the corner, so that the actual turning radius of the own vehicle becomes close to the radius of the corner. Therefore, even when steering is turned excessively, or deceleration is insufficient, the vehicle can be made to travel to pass the corner reliably.

In order to attain the above-described second object, according to a second feature of the present invention, there is provided a motion control apparatus for a vehicle, comprising: road data storing means for storing road data; own vehicle position detecting means for detecting an own vehicle position on the road data; vehicle speed detecting means for detecting an own vehicle speed; corner radius arithmetically operating means for obtaining a radius of a corner existing on a route on which an own vehicle is traveling at present, based on the road data and the own vehicle position; motion parameter detecting means for detecting motion parameters expressing a turning motion state of the own vehicle; actual turning radius arithmetically operating means for arithmetically operating and estimating an actual turning radius when the own vehicle enters the corner, based on at least the own vehicle speed and the motion parameters; radius difference calculating means for calculating a difference between the radius arithmetically operated at the corner radius arithmetically operating means and the actual turning radius; motion state determining means for determining a motion state of the own vehicle at the corner with respect to at least discrimination of an understeer state and an oversteer state, based on a calculation by the radius difference calculating means; and motion state control means for controlling the motion state of the own vehicle to cancel the understeer state or the oversteer state, which is determined by the motion state determining means.

According to the construction of the second feature, the motion state of the vehicle is determined based on the difference between the radius of the corner on which the own vehicle is traveling and the actual turning radius being the turning radius of the traveling locus which the own vehicle will draw when entering the corner, to determine at least whether the motion state of the own vehicle is in the understeer state or the oversteer state. Therefore, by performing the motion control of the vehicle based on the determination result, the vehicle can be made to travel to pass the corner reliably even when the steering is turned excessively, or deceleration is insufficient.

DETAILED DESCRIPTION OF THE PREFERRED EMBODIMENT

The present invention will be explained below based on one embodiment of the present invention shown in the attached drawings.

Figure 1:
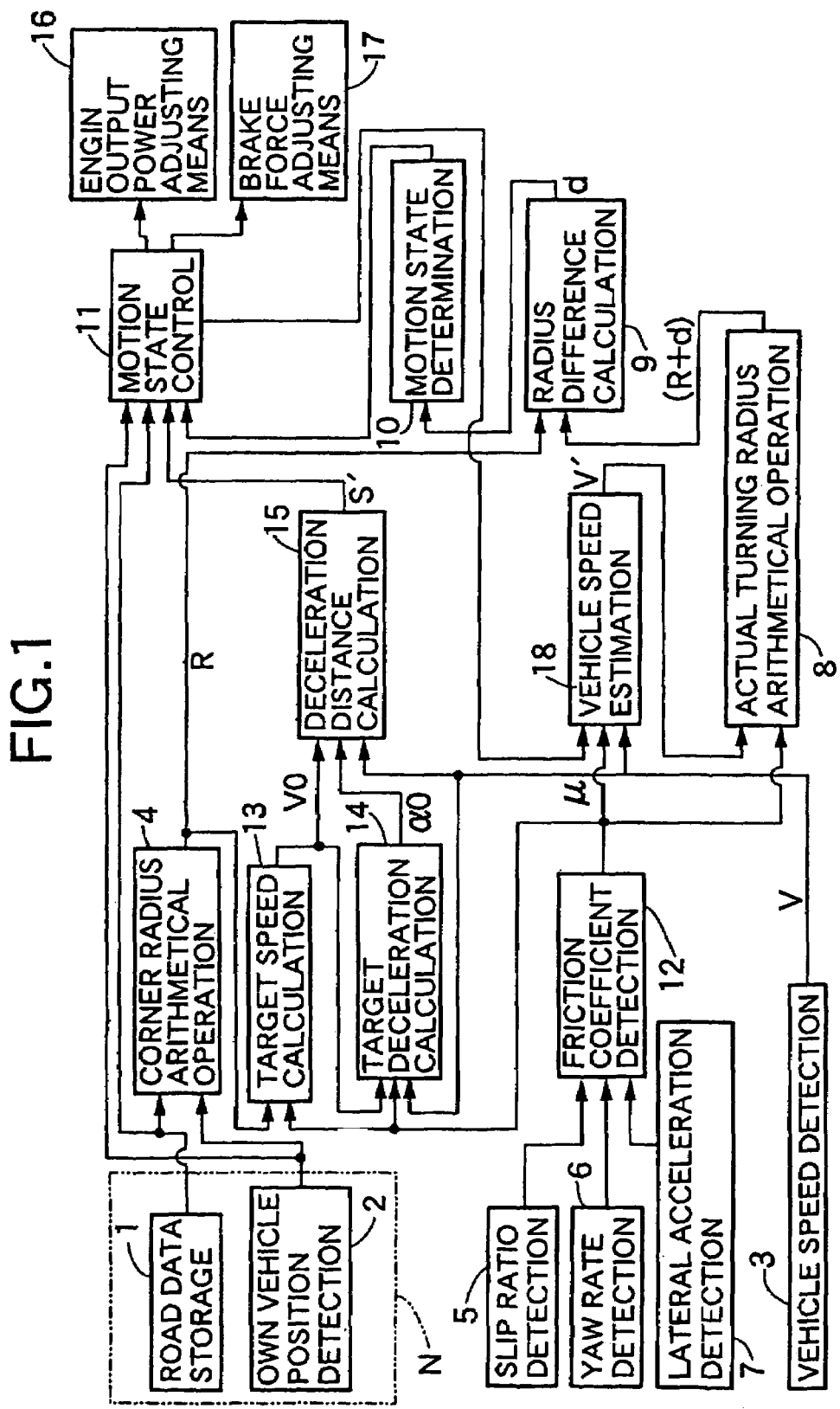
FIG. 1 is a block diagram showing a construction of a motion control apparatus.

First, in FIG. 1, a motion control apparatus of a vehicle includes road data storing means 1 for storing road data, own vehicle position detecting means 2 for detecting an own vehicle position on the road data, vehicle speed detecting means 3 for detecting an own vehicle speed, a corner radius arithmetically operating means 4 for obtaining a radius of a corner existing on a route on which the own vehicle is traveling at present, based on the road data and the own vehicle position, slip ratio detecting means 5, yaw rate detecting means 6 and lateral acceleration detecting means 7 as first to third motion parameter detecting means for respectively detecting a slip ratio, a raw rate and lateral acceleration being motion parameters showing a turning motion state of the own vehicle, actual turning radius arithmetically operating means 8 for arithmetically operating and estimating an actual turning radius when the own vehicle enters the corner based on at least the own vehicle speed and the slip ratio, and the yaw rate and the lateral acceleration, radius difference calculating means 9 for calculating a difference between the radius arithmetically operated by the corner radius arithmetically operating means 4 and the actual turning radius, motion state determining means 10 for determining the motion state of the own vehicle at the corner with respect to at least discrimination of an understeer state and an oversteer state based on the calculation by the radius difference calculating means 9, and motion state control means 11 for controlling the motion state of the own vehicle to cancel the understeer state or the oversteer state which is determined by the motion state determining means 10.

Figure 2:
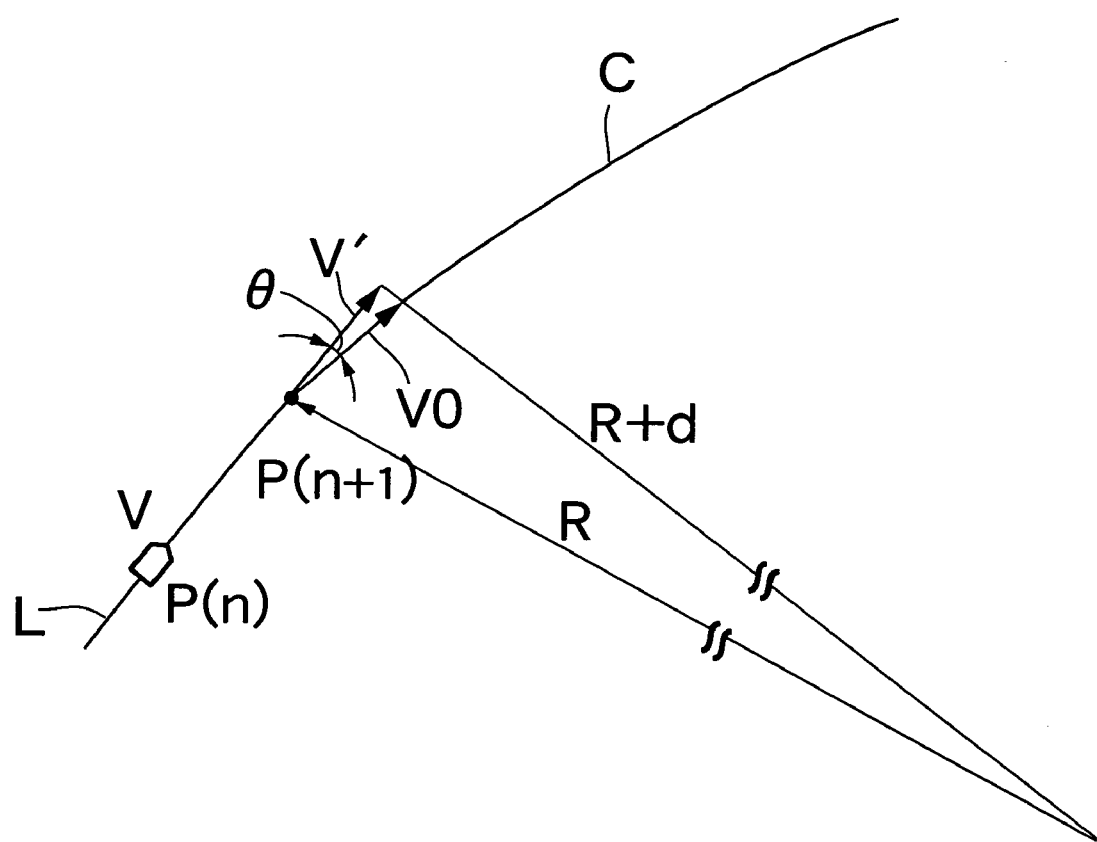
FIG. 2 is a diagram for explaining a control on turning and traveling a corner.

The storing means 1 and the own vehicle position detecting means 2 are contained in a navigation system N, and the corner radius arithmetically operating means 4 arithmetically operates a radius R of a corner C existing on the route on which the own vehicle is traveling at present, based on the road data stored in the storing means 1 and the own vehicle position detecting means 2, as shown in FIG. 2.

The slip ratio, the yaw rate and the lateral acceleration detected by the slip ratio detecting means 5, the yaw rate detecting means 6 and the lateral acceleration detecting means 7 are inputted to friction coefficient detecting means 12, which detects a friction coefficient μ of the road surface on which the own vehicle is traveling by arithmetical operation based on the slip ratio, the yaw rate and the lateral acceleration.

The friction coefficient μ detected by this friction coefficient detecting means 12 and the radius R arithmetically operated by the corner radius arithmetically operating means 4 are inputted to target speed calculating means 13, and the target speed calculating means 13 calculates a target speed VO to turn easily along the corner C shown in FIG. 2, based on the friction coefficient μ and the radius R. Namely, when a speed, at which the vehicle turns the corner C with the turning radius R and friction coefficient μ at the target speed VO in a state in which lateral force is balanced, is assumed to be the target speed VO, and when the gravitational acceleration is assumed to be 9.8 m/sec², $\{9.8 \times \mu = VO^2/R\}$ is established, and therefore the target speed VO can be calculated as $VO = (9.8 \times \mu \times R)^{1/2}$.

The target speed VO calculated by the target speed calculating means 13, the friction coefficient μ detected by the friction coefficient detecting means 12 and the own vehicle speed V detected by the vehicle speed detecting means 3 are inputted to target deceleration calculating means 14, which calculates a target deceleration αO based on the target speed VO, the friction coefficient μ and the own vehicle speed V.

Here, for example, on calculating the target deceleration αO at a spot P(n) on a linear road L just before the vehicle enters a turning start point P(n+1) when the turning start point P(n+1) of the corner C exists at an end of a linear road L, the deceleration necessary for the vehicle traveling at the own vehicle speed V at the spot P(n) to decelerate to the target speed VO is calculated as the target deceleration αO, and in this case, the target deceleration αO is set as the value which is (μ×9.8) or less.

The target speed VO calculated by the target speed calculating means 13, the target deceleration αO calculated by the target deceleration calculating means 14, and the own vehicle speed V detected by the vehicle speed detecting means 3 are inputted to deceleration distance calculating means 15, which arithmetically operates an estimate shortest deceleration distance S' based on the target speed VO, the target deceleration αO and the own vehicle speed V according to $S' = (V - VO)^2 / (2 \times \alpha O \times 9.8)$.

Further, the road data from the road data storing-means 1, the own vehicle position from the own vehicle position detecting means 2 and the estimate shortest deceleration distance S' calculated by the deceleration distance calculating means 15 are inputted to the motion state control means 11, which controls at least one of engine output adjusting means 16 and brake force adjusting means 17 based on the road data, the own vehicle position and the estimate shortest deceleration distance S' before the vehicle enters the corner C so as to decelerate to the speed at which the vehicle turns the corner C easily at the turning start point P(n+1).

The friction coefficient μ detected by the friction coefficient detecting means 12, the own vehicle speed V detected by the vehicle speed detecting means 3, and the deceleration based on the decelerating control by the vehicle motion state control means 11 are inputted to vehicle speed estimating means 18, which arithmetically operates and estimates an estimated speed V' of the own vehicle at the turning start point P(n+1) of the corner C based on the friction coefficient μ, the own vehicle speed V and the controlled deceleration.

The estimated speed V' obtained by this vehicle speed estimating means 18 and the friction coefficient μ detected by the friction coefficient detecting means 12 are inputted to the actual turning radius arithmetically operating means 8, which arithmetically operates and estimates an actual turning radius (R+d) when the own vehicle enters the corner C based on the estimated speedy V' and the friction coefficient μ according to $\{R+d = V'^2 / (9.8 \times \mu)\}$.

Since the friction coefficient μ is obtained based on the slip ratio, the yaw rate and the lateral acceleration which are the motion parameters expressing the turning motion state of the own vehicle, and the estimated speed V' is obtained based on the friction coefficient μ, the own vehicle speed V and the deceleration, the actual turning radius (R+d) is obtained based on at least the own vehicle speed V, the slip ratio being the motion parameter, the yaw rate and the lateral acceleration.

The radius R arithmetically operated by the corner radius arithmetically operating means 4, and the actual turning radius (R+d) obtained by the actual turning radius calculating means 8 are inputted to the radius difference calculating means 9, and the radius difference $\underline{d}$ between the radiuses (R+d) and R is obtained by the radius difference calculating means 9.

The radius difference $\underline{d}$ obtained by the radius difference calculating means 9 is inputted to the motion state determining means 10, which determines whether the motion state of the own vehicle at the corner C is in the understeer state or in the oversteer state according to which symbol of positive or negative is affixed to the radius difference $\underline{d}$. Namely, the motion state determining means 10 determines that it is the understeer state when "+d" is obtained by the radius difference calculating means 9, and determines that it is the oversteer state when "−d" is obtained by the radius difference calculating means 9.

The determination by this motion state determining means 10 is inputted to the motion state control means 11, and when the vehicle is not sufficiently decelerated to the speed at which the vehicle easily turns the corner C, or when the steering is turned excessively, the motion control means 11 controls the motion state of the own vehicle so as to cancel the understeer state or the oversteer state by the motion control of the brake force adjusting means 17.

Next, the control procedure by the motion control apparatus constructed as mentioned above will be explained with reference to FIG. 3. The radius R of the corner C based on the arithmetical operation by the corner radius arithmetically operating means 4 is obtained in step S1; the target speed VO to turn along the corner C easily is calculated by the target speed calculating means 13 based on the friction coefficient μ detected by the friction coefficient detecting means 12 and the radius R in step S2; and the target deceleration αO to decelerate to the target speed VO is calculated by the target deceleration calculating means 14 based on the own vehicle speed V detected by the vehicle speed detecting means 3, the target speed VO and the friction coefficient μ in step S3.

Figure 4:
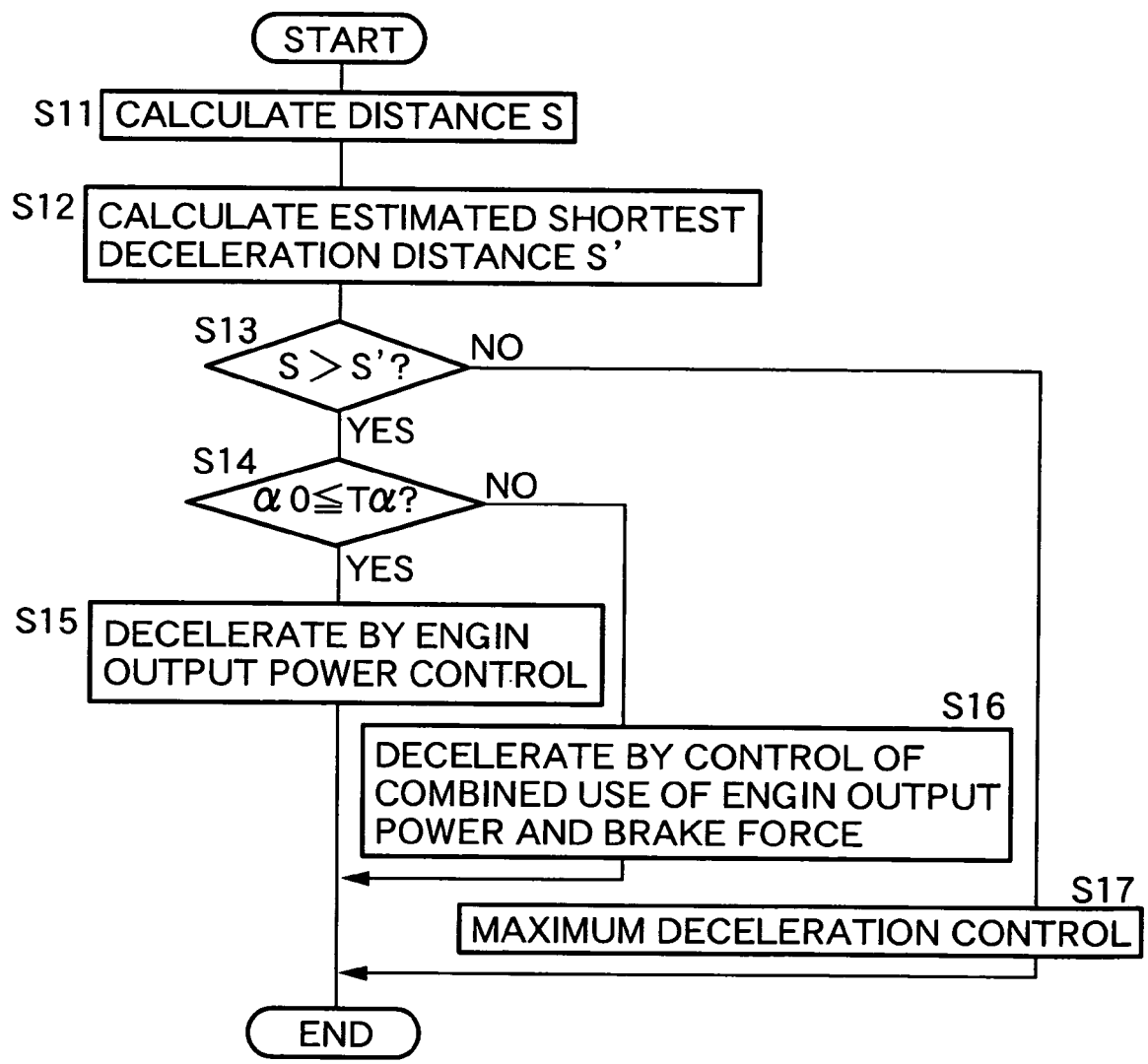
FIG. 4 is a flow chart showing a subroutine for executing a deceleration control.

The deceleration control in step S4 follows the procedure shown in FIG. 4. In step S11 in FIG. 4, a distance S from the spot P(n) on the linear road L just before entrance to the turning start point P(n+1) to the turning start point P(n+1) is calculated; then in step S12, the estimated shortest deceleration distance S' when deceleration is started by the target deceleration αO from the spot P(n) is calculated by the deceleration distance calculating means 15.based on the target speed VO, the target deceleration αO and the own vehicle speed V; and further in step S13, it is determined whether S>S' is established or not.

Thus, when S>S' is established, it is assumed that the deceleration control to decelerate to the target speed VO until the vehicle reaches the turning start point P(n+1) is possible and the procedure is proceeded from step S13 to step S14. In step S14, it is determined whether the target deceleration αO is a set deceleration Tα or less (αO≦Tα) or not, when αO<Tα, an engine output control by the engine output adjusting means 16 is executed to decelerate the vehicle in step S15, and when Tα<αO, the vehicle is decelerated with combined use of the engine output control by the engine output power adjusting means 16 and four-wheel brake control by the brake force adjusting means 17 in step S16.

Meanwhile, in step S13, when it is determined that S≦S', the procedure is proceeded from step S13 to step S17, in which the vehicle is decelerated to the maximum by maximizing the combined use of the engine output control by the engine output power adjusting means 16 and the four-wheel brake control by the brake force adjusting means 17.

Figure 3:
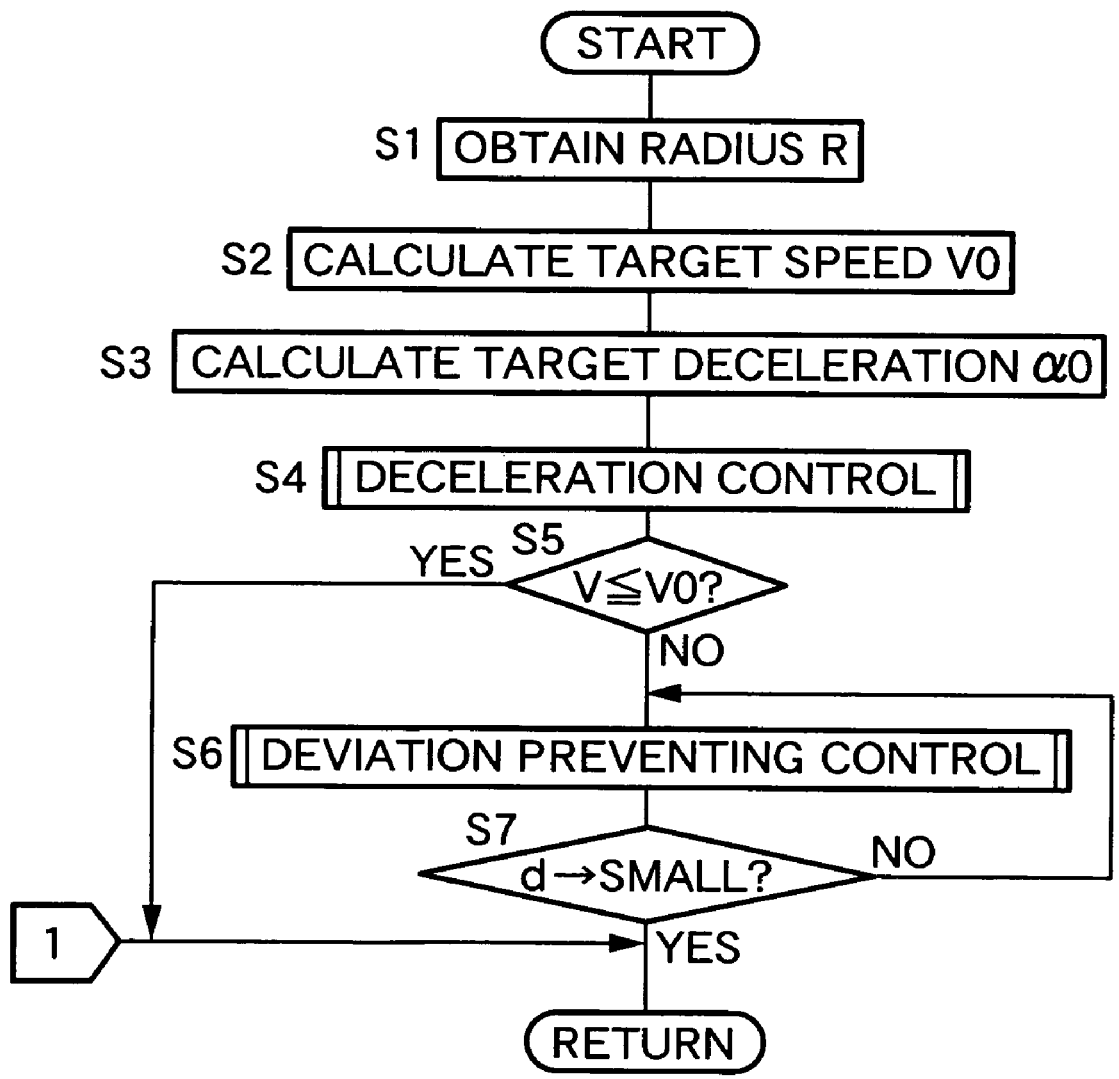
FIG. 3 is a flowchart showing a main routine of a motion control procedure.

Again in FIG. 3, in step S5 after the decelerating control in step S4 is finished, it is determined whether the own vehicle speed V at the turning start point P(n+1) is the target speed VO or less (V≦VO) or not, and when V≦VO, it is determined as possible to turn the corner C easily and the motion state control of the vehicle is finished.

Figure 5:
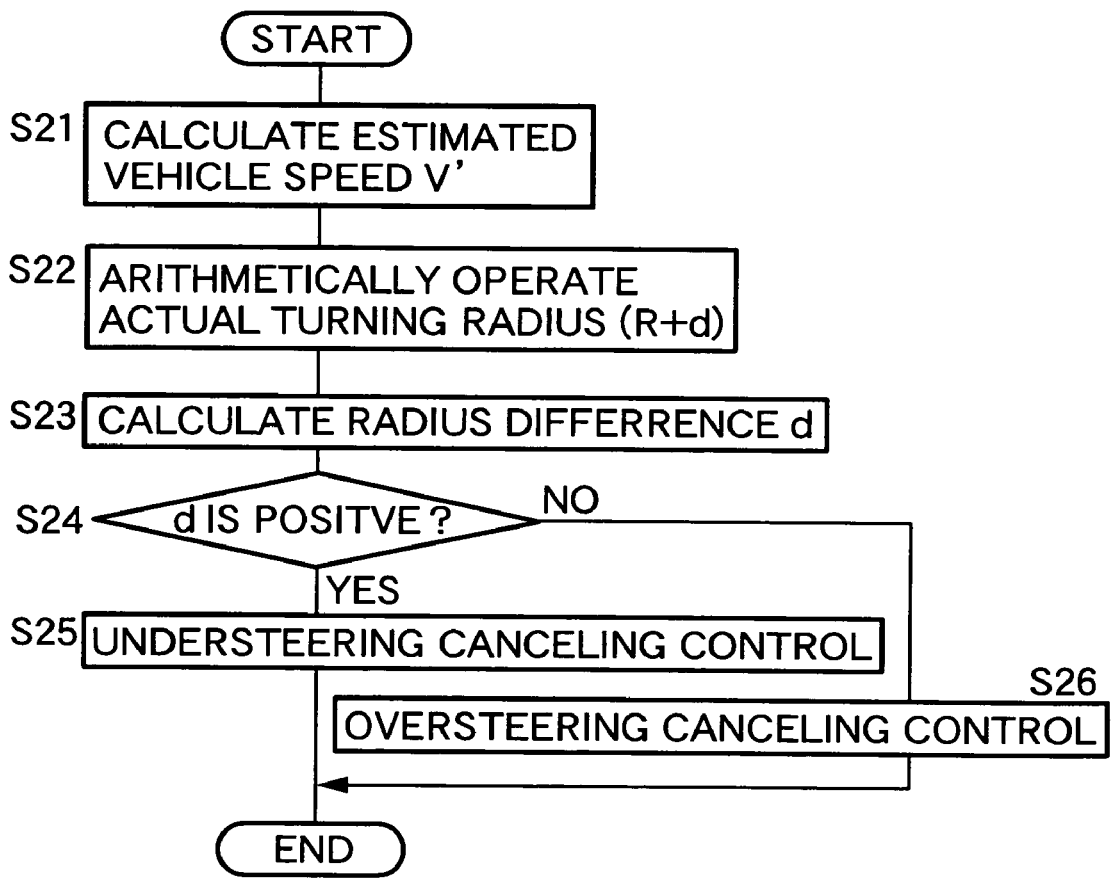
FIG. 5 is a flow chart showing a subroutine for executing a deviation preventing control.

When it is determined that VO<V in step S5, the procedure is proceeded to step S6 to execute the deviation preventing control in accordance with the procedure shown in FIG. 5.

Instep S21 in FIG. 5, the estimated speed V' of the own vehicle at the turning start point P(n+1) of the corner C is estimated by the vehicle speed estimating means 18 based on the deceleration by the decelerating control, the friction coefficient μ and the own vehicle speed V. In step S22, the actual turning radius (R+d) when the own vehicle enters the corner C is arithmetically operated and estimated by the actual turning radius arithmetically operating means 8 based on the estimated speed V' and the friction coefficient μ. In step S23, the radius difference $\underline{d}$ which is the difference between the radius R arithmetically operated by the corner radius arithmetically operating means 4 and the actual turning radius (R+d) obtained by the actual turning radius calculating means 8, is obtained through the arithmetical operation by the radius difference calculating means 9.

In step S24, it is determined whether the radius difference $\underline{d}$ is positive or not, then when it is positive, the procedure is proceeded to step S25 to execute an understeer canceling control, and when it is negative, the procedure is proceeded to step S26 to execute an oversteer canceling control.

Figure 6:
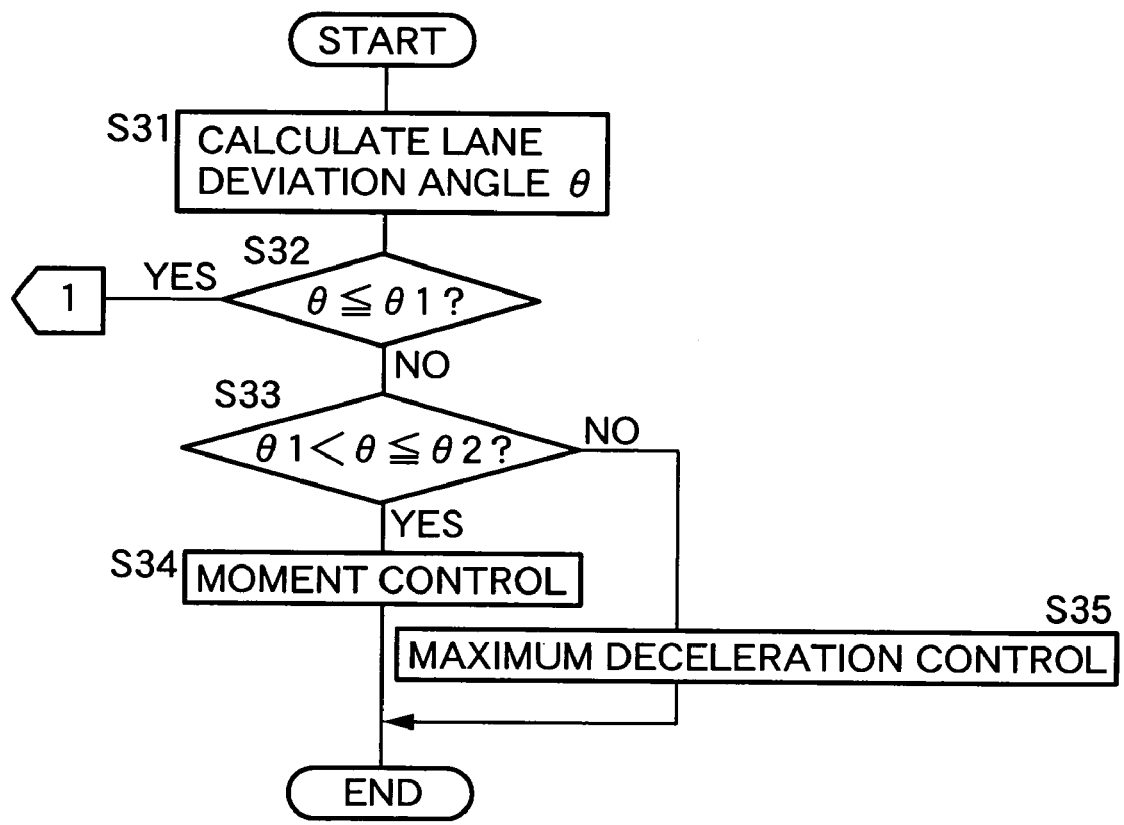
FIG. 6 is a flow chart showing a subroutine for executing an understeer canceling control.
Figure 7:
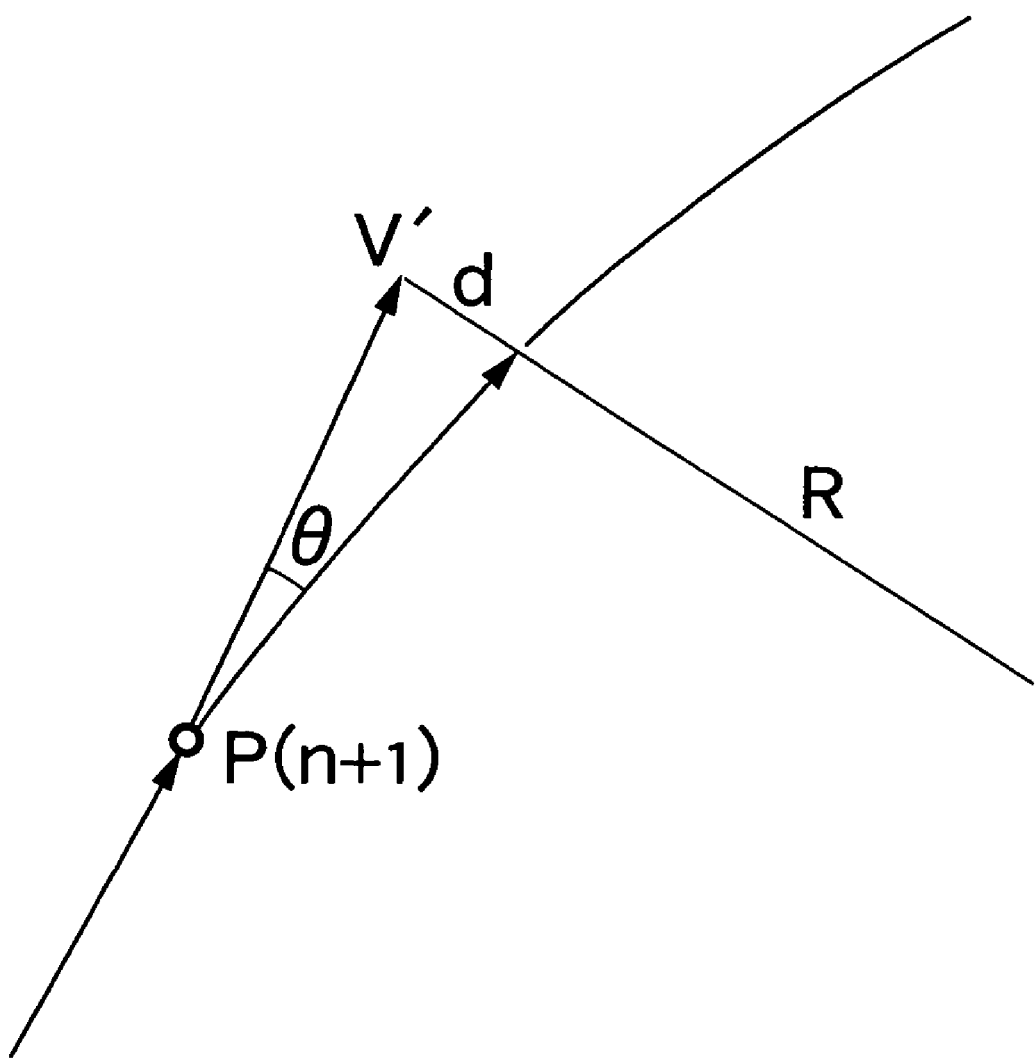
FIG. 7 is an explanatory diagram concerning calculation of a lane deviation angle.

The understeer canceling control is executed in accordance with the procedure shown in FIG. 6. In step S31, a lane deviation angle θ shown in FIG. 7 when the vehicle would travel for predetermined time $\underline{t}$ at the estimated speed V' from the turning start point P(n+1) is calculated. Namely, tanθ=d/(V'×t), and therefore θ≦d/(V'×t).

Instep S32, it is determined whether or not the lane deviation angle θ is a first set angle θ1 or less. When θ≦θ1, it is determined that the understeer canceling control is unnecessary and the motion control of the vehicle is finished. When θ1<θ, it is determined whether or not the lane deviation angle θ exists in an area, which is not larger than a second set angle θ2 larger than the first set angle θ1 and is larger than the first set angle θ1, in step S33. When θ1<θ≦θ2, a moment control is executed in step S34, and when θ2≦θ, a maximum deceleration control is executed in step S35.

The moment control in step S34 executes the four-wheel brake control by the brake force adjusting means 17 to control the brake forces of the four wheels individually while making them different from each other. The maximum deceleration control in step S35 executes the four-wheel brake control by the brake force adjusting means 17 so that the brake forces of the four wheels become the maximum values respectively.

The oversteer canceling control in step S26 is executed basically with the same procedure as the procedure shown in FIG. 6 except that the direction of the moment control differs 180 degrees from that of the understeer canceling control.

Again in FIG. 3, it is determined whether the radius difference d is sufficiently small or not in step S7 after the deviation preventing control in step S6 is executed, and when it does not become small, a command is given to return to step S6, and the deviation preventing control is continued so that the actual turning radius (R+d) becomes close to the radius R of the corner C.

Next, an operation of this embodiment will be explained. When the vehicle enters the corner C while it is not sufficiently decelerated before it reaches the turning start point P(n+1), even if excessive turning of steering occurs, the motion state of the vehicle is controlled based on the difference d between the radius R of the corner C and the actual turning radius (R+d) being the turning radius of the traveling locus which the vehicle will draw when it enters the corner C, so that the actual turning radius (R+d) becomes close to the radius R of the corner C, whereby the vehicle can be made to travel to pass the corner C, reliably.

In addition, the motion state of the vehicle is determined based on the difference d between the radius R of the corner C and the actual turning radius (R+d) being the turning radius of the traveling locus which the vehicle would draw when it enters the corner C, and it is determined at least whether the motion state of the own vehicle becomes the understeer state or the oversteer state, thereby making it possible to make the vehicle travel to pass the corner reliably by performing the motion control of the vehicle based on the determination result.

The embodiment of the present invention has been explained above, but the present invention is not limited thereto, and various design modifications can be made without departing from the subject matter of the present invention.

What is claimed is:

1. A motion control apparatus for a vehicle, comprising:
a road data storing device for storing road data;
a vehicle position detector for detecting a position of the vehicle based on the road data;
a vehicle speed detector for detecting a speed of the vehicle;
a corner radius calculating device for calculating a radius of a corner existing on a route on which the vehicle is traveling at present, based on the road data and the vehicle position;
motion parameter detectors for detecting motion parameters expressing a turning motion state of the vehicle;
an actual turning radius calculating device for arithmetically operating and estimating an actual turning radius when the vehicle enters the corner, based on at least the vehicle speed and the motion parameters;
a radius difference calculating device for calculating a difference between the radius calculated by the corner radius calculating device and the actual turning radius; and
a motion state control device for controlling a motion state of the vehicle based on a calculation by the radius difference calculating device so that the actual turning radius becomes close to the radius of the corner.

2. The motion control apparatus of claim 1 wherein the vehicle comprises a plurality of wheels, each wheel comprising a wheel brake, and
the motion state control device further comprises a brake force adjusting device adapted to individually control each of said wheel brakes, and
the motion state control device controls the vehicle through the brake force adjusting device such that the brakes are controlled individually and the forces applied to each are unique so that a vehicle direction correction is effected such that the actual turning radius becomes close to the radius of the corner.

3. A motion control apparatus for a vehicle, comprising:
a road data storing device for storing road data;
a vehicle position detector for detecting a position of the vehicle based on the road data;
a vehicle speed detector for detecting a speed of the vehicle;
a corner radius calculating device for calculating a radius of a corner existing on a route on which the vehicle is traveling at present, based on the road data and the vehicle position;
motion parameter detectors for detecting motion parameters expressing a turning motion state of the vehicle;
an actual turning radius calculating device for arithmetically operating and estimating an actual turning radius when the vehicle enters the corner, based on at least the vehicle speed and the motion parameters;
a radius difference calculating device for calculating a difference between the radius calculated by the corner radius calculating device and the actual turning radius;
a motion state determining device for determining a motion state of the vehicle at the corner with respect to at least discrimination of an understeer state and an oversteer state, based on a calculation by the radius difference calculating device; and
a motion state control device for controlling the motion state of the vehicle to cancel the understeer state or the oversteer state, which is determined by the motion state determining device.

4. A motion control apparatus for a vehicle, comprising:
a road data storing device which stores road data;
a vehicle position detector which detects a position of the vehicle based on the road data;
a vehicle speed detector which detects a speed of the vehicle;
a corner radius calculating device which calculates a radius of a corner existing on a route on which the vehicle is traveling at present, based on the road data and the vehicle position;
motion parameter detectors which detect motion parameters expressing a turning motion state of the vehicle;
an actual turning radius calculating device which calculates an actual turning radius when the vehicle enters the corner, based on at least the vehicle speed and the motion parameters;
a radius difference calculating device which calculates a difference between the radius calculated by the corner radius calculating device and the actual turning radius; and
a motion state control device for controlling a motion state of the vehicle based on a calculation by the radius difference calculating device, the motion state control device controlling the vehicle such that the actual turning radius becomes close to the radius of the corner.

* * * * *